United States Patent [19]

Thornton

[11] 3,854,999

[45] Dec. 17, 1974

[54] MERCURIC OXIDE ELECTRODE AND METHOD OF FORMING

[75] Inventor: Roy F. Thornton, Schenectady, N.Y.

[73] Assignee: General Electric Company, Schenectady, N.Y.

[22] Filed: Nov. 1, 1972

[21] Appl. No.: 302,798

[52] U.S. Cl.................................. 136/20, 136/120
[51] Int. Cl. ......................................... H01m 35/02
[58] Field of Search ............ 136/20, 120, 102, 107, 136/83

[56] References Cited
UNITED STATES PATENTS

| | | | |
|---|---|---|---|
| 2,579,743 | 12/1951 | Kurlandsky | 136/120 R |
| 2,772,321 | 11/1956 | Ensign | 136/20 X |
| 3,507,773 | 4/1970 | Grangaard | 136/120 X |
| 3,672,997 | 6/1972 | Jerabek | 136/20 |
| 3,698,953 | 10/1972 | Eisenberg | 136/20 |

Primary Examiner—Winston A. Douglas
Assistant Examiner—C. F. Lefevour
Attorney, Agent, or Firm—Paul R. Webb, II; Joseph T. Cohen; Jerome C. Squillaro

[57] ABSTRACT

A method of forming a mercuric oxide electrode is described which comprises mixing together mercuric oxide powder and silver powder, prepressing the powder mixture, grinding the pressed powder mixture to a powder mixture, adding 0.5 to 2.0 parts by weight of wax to the mercuric oxide-silver powder mixture, placing the mixture in a pressing die, positioning at least one mesh or screen current collector on the mixture, and compacting the mixture against the collector thereby forming an electrode. A second method is described which eliminates the prepressing step and the grinding step of the above first method. The electrode produced by my second method as opposed to a similar electrode without the wax addition results in higher capacity per unit volume. A mercuric oxide electrode is also described.

5 Claims, 1 Drawing Figure

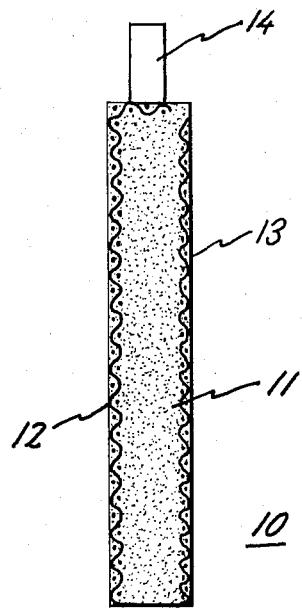

MERCURIC OXIDE ELECTRODE AND METHOD OF FORMING

This invention relates to mercuric oxide electrodes and to methods of forming mercuric oxide electrodes and, more particularly, to such electrodes and to methods of forming mercuric oxide electrodes wherein 0.5 to 2.0 parts by weight of wax are incorporated in the electrodes.

Such mercuric oxide electrodes are useful as cathodes in primary batteries. For example, a conventional mercuric oxide-zinc battery has an electrically insulating casing, a pressed mercuric oxide cathode positioned in the casing, and an anode, such as a pressed zinc anode positioned in the casing and spaced from the cathode. A chemically inert porous separator is also positioned between the electrodes, and an alkaline electrolyte such as potassium hydroxide or sodium hydroxide is in contact with the electrodes.

One major problem with press-powder mercuric oxide electrodes is the fracturing and laminating of the electrode during its removal from the pressing die.

My present invention is directed to an improved method of forming a mercuric oxide electrode wherein 0.5 to 2.0 parts by weight of wax are incorporated in the powder mixture prior to pressing to eliminate the above problems and to provide a binder for the pressed powder mixture.

The primary objects of my invention are to provide an improved mercuric oxide electrode and to provide an improved method of forming a mercuric oxide electrode which results in a structurally sound electrode.

In accordance with one aspect of my invention, a method of forming a mercuric oxide electrode is disclosed which comprises mixing together mercuric oxide powder and silver powder, prepressing the powder mixture, grinding the pressed powder mixture to a powder mixture, adding 0.5 to 2.0 parts by weight of wax to the mercuric oxide-silver powder mixture, placing the mixture in a pressing die, positioning at least one mesh or screen current collector on the mixture, and compacting the mixture against the collector thereby forming an electrode.

These and various other objects, features and advantages of the invention will be better understood from the following description taken in connection with the accompanying drawing in which:

The single FIGURE is a sectional view of an electrode made in accordance with my invention.

Electrode 10 comprises a powder compact 11 of 84 parts by weight of mercuric oxide, and 16 parts by weight of silver powder. Wax is present in an amount of 1.0 part by weight of the mixed powders. Compact 11 is pressed into current collector screens 12 and 13. An electrical lead 13 is shown in electrical contact with electrode 10 by being affixed to screen 12.

I found unexpectedly that a mercuric oxide electrode could be formed by a press-powder method which resulted in a structurally sound electrode. I found further that I could also eliminate the prepressing and grinding steps in a press-powder method. My unique discovery is the addition of 0.5 to 2.0 parts by weight of wax to the mercuric oxide mixture prior to pressing or compacting which improved method eliminates fracturing and laminating of the electrode during its removal from the pressing die. The resulting improved electrode delivers at least 96 percent of its theoretical capacity.

In my improved method of forming a mercuric oxide electrode, I prefer to mix silver powder with mercuric oxide powder to amalgamate metallic mercury as it is formed. The preferred minimum silver powder content is 16 parts by weight. Thus, I mix together preferably 84 parts by weight of mercuric oxide, and 16 parts by weight of silver powder. In a first embodiment of my invention, I prepress the powder mixture in a preferred pressure range of 10,000 to 40,000 pounds per square inch. The pressed powder mixture is then ground to a powder mixture.

I add then 0.5 to 2.0 parts by weight of wax, preferably paraffin wax, to the above mixture. A weighed amount of the mixture with wax is placed in a pressing die and the mixture is leveled. A mesh or screen current collector with attached lead is placed on the mixture. I employ then a pressing step wherein a preferred pressure range of 10,000 to 40,000 pounds per square inch is used. This pressing step presses or compacts the mixture against the screen resulting in my improved mercuric oxide electrode.

While at least one screen is employed, it may be desired to employ a screen on each major surface as shown in the drawing. A silver mesh or screen current collector is preferred. However, other suitable mesh or screen current collectors can be made of nickel, or nickel-plated steel. While a mesh or screen is preferred, other configurations can be employed. Various amounts of silver powder can be employed with the mercuric oxide powder. While paraffin wax is preferred, other waxes can be employed. Other waxes, which are suitable, are waxes which are soluble in one or more organic solvents but which are insoluble in an alkaline electrolyte solution.

In a second embodiment of my invention, my improved method eliminates the prepressing step and the grinding step of the first embodiment. However, my second method results in a structurally sound electrode. In my second method, I add directly 0.5 to 2.0 parts by weight of wax to the mercuric oxide-silver powder mixture. The mixture is then placed in a pressing die, and at least one mesh current collector is positioned on opposite major surfaces. The mixture is compacted against the collector thereby forming an electrode. The electrode produced by my second method as opposed to a similar electrode without the wax addition results in higher capacity per unit volume.

Examples of methods of forming mercuric oxide electrodes are set forth below. Example I sets forth such methods and electrodes which were made in accordance with my invention. Example II sets forth such methods and electrodes which were not made in accordance with my invention. Example III sets forth such methods and electrodes which were made in accordance with my invention.

EXAMPLE I

I prepared 10 electrodes in accordance with my improved method. Each of the 10 electrodes were formed as follows:

A mixture of 84 parts by weight of mercuric oxide and 16 parts by weight of silver powder was prepared. The powder mixture was prepressed as set forth in Table I. The pressed powder mixture was then ground to a powder mixture. Paraffin wax was then added to each mixture as set forth in Table I. A weighed amount of the mixture with wax was placed in a pressing die and the mixture was leveled. A silver mesh current collector with an active area of 1.5 in$^2$ with attached lead was placed on the mixture. Each mixture and mesh was pressed or compacted at a pressure as shown in Table II below which resulted in compacting the mixture against the mesh resulting in a mercuric oxide electrode. The capacity of each electrode was determined by discharging each of the electrodes in a 30 percent aqueous sodium hydroxide solution. Table II sets forth the electrode numbers and their respective capacities.

TABLE I

| Electrode Number | Prepressing Pressure-P.S.I. | % Part by Weight - Paraffin wax |
|---|---|---|
| 1 | 20,000 | 1.0 |
| 2 | 20,000 | 1.0 |
| 3 | 20,000 | 1.0 |
| 4 | 20,000 | 1.0 |
| 5 | 40,000 | 1.0 |
| 6 | 40,000 | 1.5 |
| 7 | 40,000 | 2.0 |
| 8 | 40,000 | 1.0 |
| 9 | 40,000 | 1.0 |
| 10 | 40,000 | 1.0 |

TABLE II

| Electrode Number | Compacting Pressure-P.S.I. | Capacity -amp-hr/in$^3$ |
|---|---|---|
| 1 | 10,000 | 26.5 |
| 2 | 20,000 | 29.1 |
| 3 | 30,000 | 30.2 |
| 4 | 40,000 | 30.9 |
| 5 | 10,000 | 26.6 |
| 6 | 10,000 | 25.0 |
| 7 | 10,000 | 23.6 |
| 8 | 20,000 | 29.5 |
| 9 | 30,000 | 30.4 |
| 10 | 40,000 | 31.5 |

EXAMPLE II

I prepared five electrodes, Numbers 11–15 not in accordance with my improved method. No powder grinding or prepressing was employed. As opposed to my improved method, I did not employ in this Example the step of adding paraffin wax to the powder mixture.

Each of the five electrodes, Numbers 11–15, were formed as follows: A mixture of 84 parts by weight of mercuric oxide and 16 parts by weight of silver powder was prepared. No paraffin wax was added to the mixture. No grinding or prepressing steps were used. A weighed amount of the mixture was placed in a pressing die and the mixture was leveled. A silver mesh current collector with attached lead was placed on the mixture. The active electrode area of the first electrodes 11–14 was 0.5 square inch while the active area of the electrode 15 was 1.5 square inch. Each mixture and mesh was pressed or compacted at a pressure as shown in Table III which resulted in compacting the mixture against the mesh resulting in a mercuric oxide electrode.

These electrodes 11–15 are set forth below in Table III with the actual pressure in pounds per square inch which was applied to form each electrode.

TABLE III

| Electrode Number | Pressure - P.S.I. |
|---|---|
| 11 | 10,000 |
| 12 | 20,000 |
| 13 | 30,000 |
| 14 | 40,000 |
| 15 | 10,000 |

After the above pressing step each of the electrodes was removed from its associated die. Electrode 11 was very fragile while electrodes 12, 13 and 14 were laminated. Electrode 15 was broken. Because of the condition of electrodes 11 and 15 their capacity was not measured. However, the capacities of electrodes 12, 13 and 14 were measured which capacity was expressed in ampere hours per cubic inch. The capacities of electrodes 12, 13 and 14 were determined by discharging each of the electrodes in a 30 percent aqueous sodium hydroxide solution. Table IV sets forth the electrode numbers and their respective capacities.

TABLE IV

| Electrode Number | Capacity -amp-hr/in$^3$ |
|---|---|
| 12 | 24.4 |
| 13 | 26.2 |
| 14 | 27.6 |

EXAMPLE III

I prepared 12 more electrodes, Numbers 16–27, in accordance with my improved method. No powder grinding or prepressing was employed. Each electrode was prepared by mixing together 84 parts by weight of mercuric oxide and 16 parts by weight of silver powder. Various parts by weight of paraffin wax was added to each mixture which parts by weight fell in a range of 0.5 to 2.0 parts by weight. A weighed amount of each mixture with wax was placed in a pressing die and the mixture was leveled. A silver mesh current collector with attached lead was placed on the mixture. Each mixture was then pressed with a pressure as shown in Table V thereby compacting the mixture against the mesh resulting in the mercuric oxide electrode.

Table V sets forth below these electrodes under number 16–27 with the percent by parts of paraffin added, and the pressure in pounds per square inch employed in the pressing step. Each of these electrodes except No. 17 had an active area of 1.5 square inches. Electrode No. 17 had an active area of 0.5 square inches.

TABLE V

| Electrode Number | % Parts By Weight - Paraffin Wax | Pressure - P.S.I. |
|---|---|---|
| 16 | 0.5 | 20,000 |
| 17 | 0.5 | 40,000 |
| 18 | 1.0 | 10,000 |
| 19 | 1.0 | 20,000 |
| 20 | 1.0 | 30,000 |
| 21 | 1.0 | 40,000 |
| 22 | 1.3 | 10,000 |
| 23 | 2.0 | 10,000 |
| 24 | 2.0 | 10,000 |
| 25 | 2.0 | 10,000 |
| 26 | 2.0 | 10,000 |
| 27 | 2.0 | 10,000 |

The capacity of each of the electrodes 16–27 was determined by discharging each of the electrodes in the 30 percent aqueous sodium hydroxide solution. Table VI sets forth the electrodes 16–27 and their respective capacities.

TABLE VI

| Electrode Number | Capacity -amp-hr/in$^3$ |
| --- | --- |
| 16 | 27.3 |
| 17 | 29.4 |
| 18 | 23.1 |
| 19 | 28.5 |
| 20 | 29.3 |
| 21 | 31.1 |
| 22 | 23.5 |
| 23 | 26.0 |
| 24 | 25.2 |
| 25 | 24.8 |
| 26 | 25.6 |
| 27 | 23.7 |

While other modifications of the invention and variations thereof which may be employed within the scope of the invention have not been described, the invention is intended to include such as may be embraced within the following claims.

What I claim as new and desire to secure by Letters Patent of the United States is:

1. A method of forming a mercuric oxide electrode comprises mixing together mercuric oxide powder and silver powder, prepressing the powder mixture, grinding the mixture adding 0.5 to 2.0 parts by weight of wax to the mercuric oxide-silver powder mixture, placing the mixture in a pressing die, positioning at least one mesh current collector on the mixture, and compacting the mixture against the collector thereby forming an electrode.

2. A method of forming a mercuric oxide electrode as in claim 1, in which the mercuric oxide powder is 84 parts by weight, and the silver powder is 16 parts by weight.

3. A method of forming a mercuric oxide electrode as in claim 1, in which the wax is paraffin wax.

4. A method of forming a mercuric oxide electrode as in claim 1, in which the powder mixture is prepressed at a pressure in the range of 10,000 to 40,000 pounds per square inch, and the ground mixture with wax is compacted at a pressure in the range of 10,000 to 40,000 pounds per square inch.

5. A method of forming a mercuric oxide electrode as in claim 1, in which the mercuric oxide powder is 84 parts by weight and the silver powder is 16 parts by weight, the powder mixture is prepressed at a pressure of 40,000 pounds per square inch, the wax is paraffin wax, and the ground mixture with wax is compacted at a pressure of 40,000 pounds per square inch.

* * * * *